(12) United States Patent
Tsubouchi et al.

(10) Patent No.: US 6,782,772 B2
(45) Date of Patent: Aug. 31, 2004

(54) HOLLOW RACK SHAFT AND MANUFACTURING METHOD THEREOF

(75) Inventors: Akira Tsubouchi, Maebahshi (JP);
Kiyoshi Okubo, Maebahshi (JP);
Yasushi Watanabe, Maebahshi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/459,749

(22) Filed: Jun. 12, 2003

(65) Prior Publication Data

US 2003/0213321 A1 Nov. 20, 2003

Related U.S. Application Data

(62) Division of application No. 09/994,526, filed on Nov. 27, 2001.

(30) Foreign Application Priority Data

Dec. 18, 2000 (JP) ........................................ 2000-383268

(51) Int. Cl.[7] .................................................. F16H 1/04
(52) U.S. Cl. .......................... 74/422; 74/498; 72/370.21
(58) Field of Search .......................... 74/422, 498, 499; 29/893.32, 893.3, 893.4, 893.35; 72/51, 370.04, 370.21

(56) References Cited

U.S. PATENT DOCUMENTS

| 1,526,858 | A | | 2/1925 | Klasing | |
|---|---|---|---|---|---|
| 3,633,933 | A | | 1/1972 | Millard | 280/96 |
| 4,516,663 | A | | 5/1985 | D'Alessio et al. | 187/19 |
| 4,646,554 | A | * | 3/1987 | Wallis et al. | 72/406 |
| 4,741,191 | A | | 5/1988 | Anderson et al. | 72/88 |
| 5,058,446 | A | | 10/1991 | Guey | 74/89.17 |
| 5,082,077 | A | | 1/1992 | Holka | 180/79.3 |
| 5,197,561 | A | | 3/1993 | Holka | 180/79.3 |
| 5,582,070 | A | | 12/1996 | Dominguez | 74/411 |
| 2003/0097894 | A1 | * | 5/2003 | Ozeki | 74/422 |

FOREIGN PATENT DOCUMENTS

| GB | 2 169 567 A | | 7/1986 |
|---|---|---|---|
| JP | 58-218339 A | | 12/1983 |
| JP | 05-345231 A | | 12/1993 |
| JP | 06-246379 A | | 9/1994 |
| JP | 11-180318 A | | 7/1999 |
| JP | 11-278287 A | | 12/1999 |
| JP | 2000247244 | * | 9/2000 |

* cited by examiner

Primary Examiner—Robert A. Siconolfi
Assistant Examiner—Devon Kramer
(74) Attorney, Agent, or Firm—Sidley Austin Brown & Wood LLP

(57) ABSTRACT

The object of the invention is to provide a rack shaft having two rack teeth groups and hollowed throughout the whole body, to lightweightize the shaft and to reduce the cost. The two rack teeth groups are located longitudinally apart from each other and have phase difference related to an angle around the axis of the shaft. After the two rack teeth groups are formed simultaneously or sequentially by die forming on the flat bottoms of the workpiece beforehand gutter-shaped, the legs of the gutter-shaped workpiece are bent to butt to each other and, thereby, a tubular body of the shaft is given to the workpiece. The centers of the material are offset beforehand corresponding to the phase difference.

1 Claim, 10 Drawing Sheets

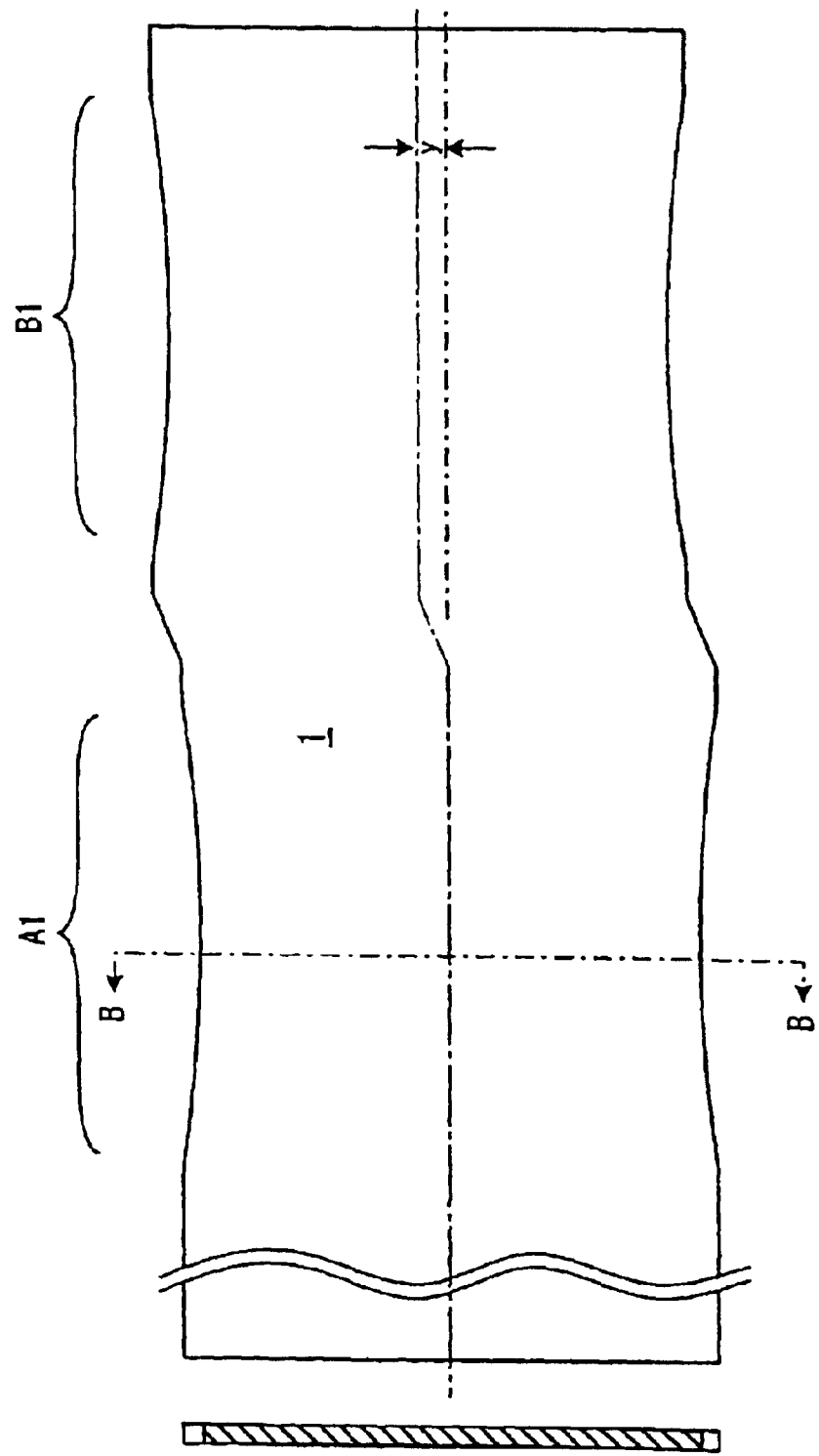

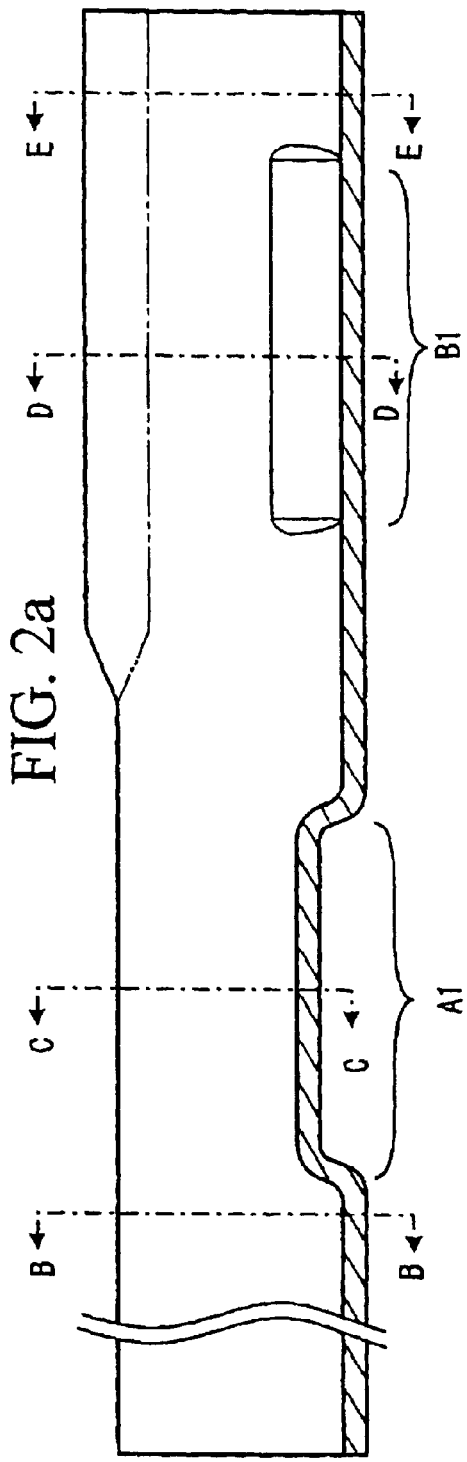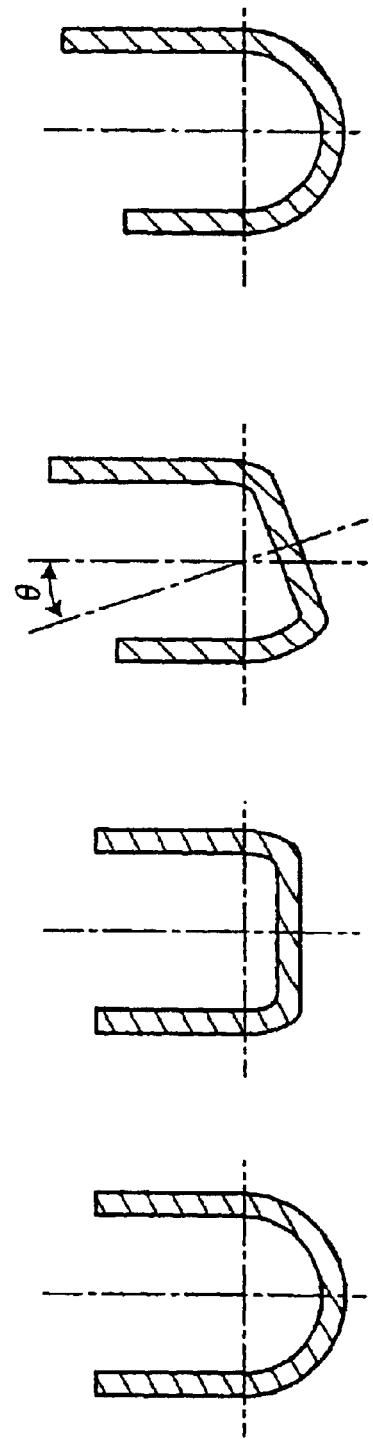

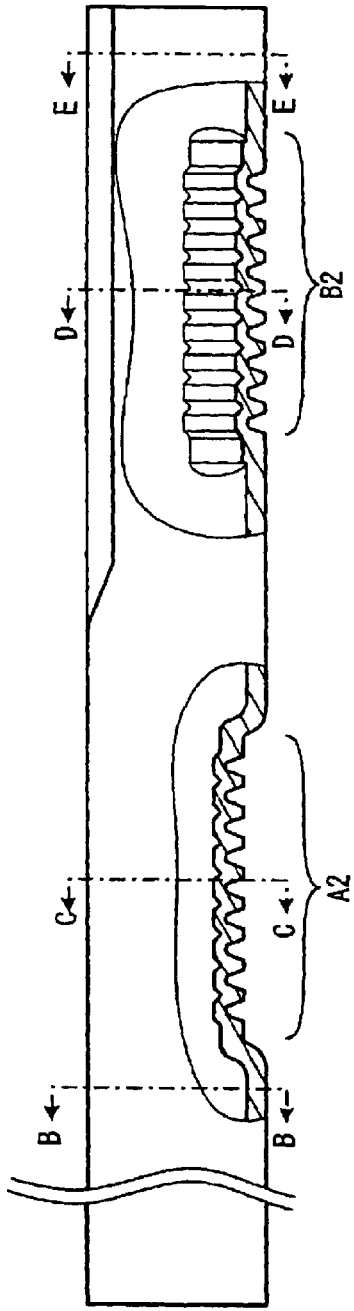
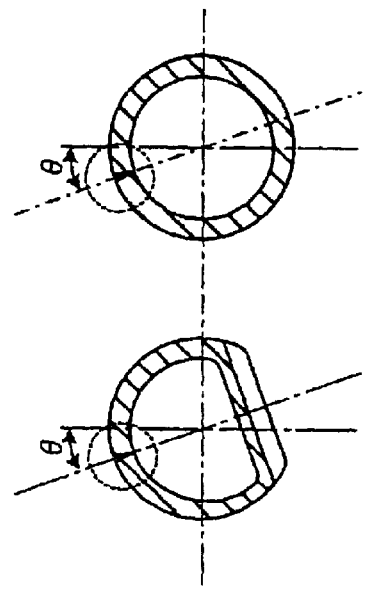
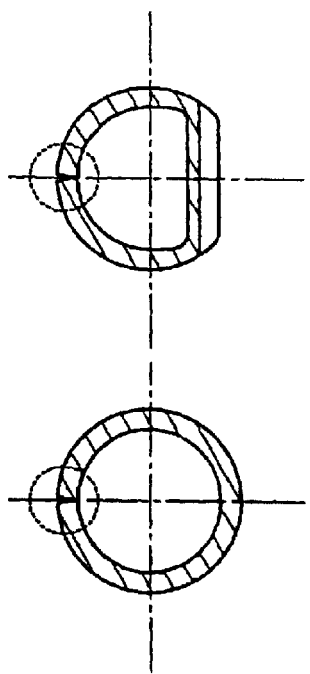
FIG. 4a  FIG. 4b  FIG. 4c  FIG. 4d  FIG. 4e

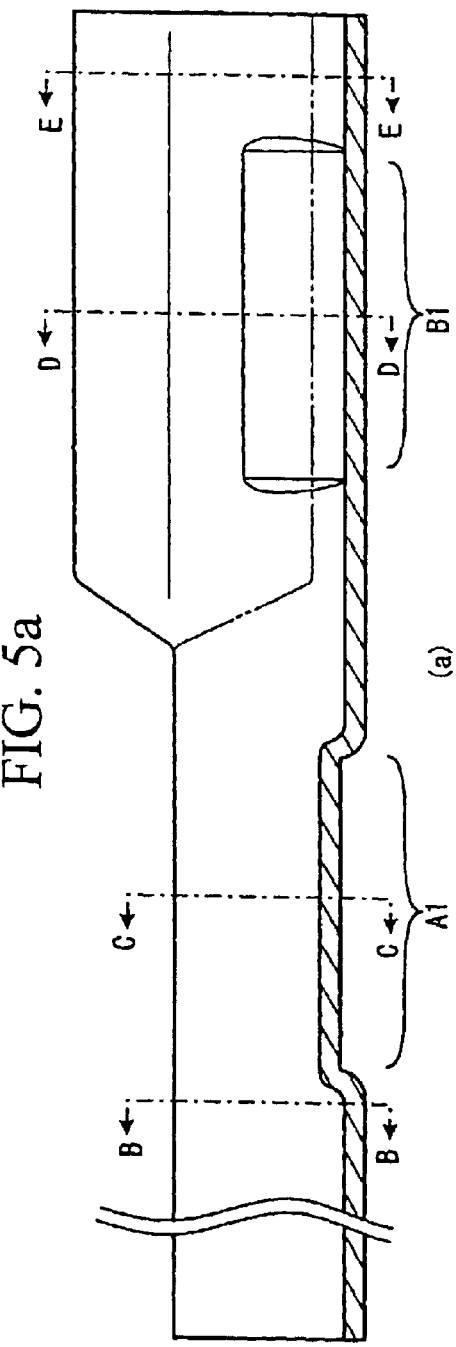
FIG. 5a
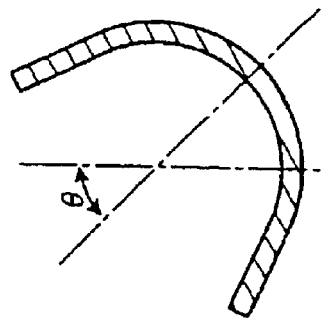
FIG. 5e
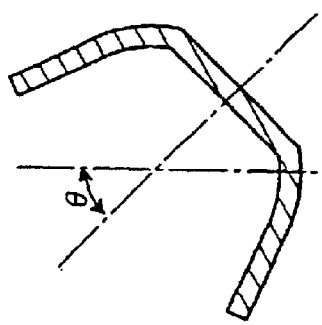
FIG. 5d
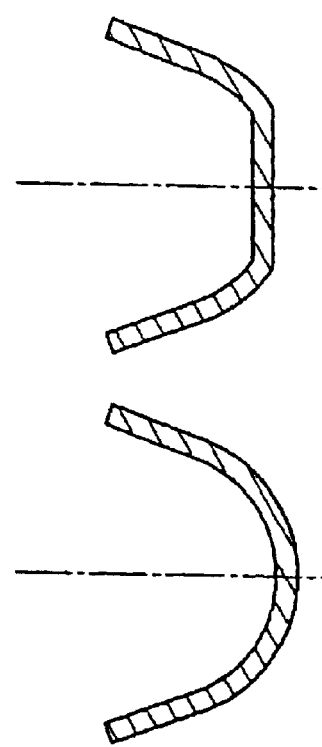
FIG. 5c
FIG. 5b

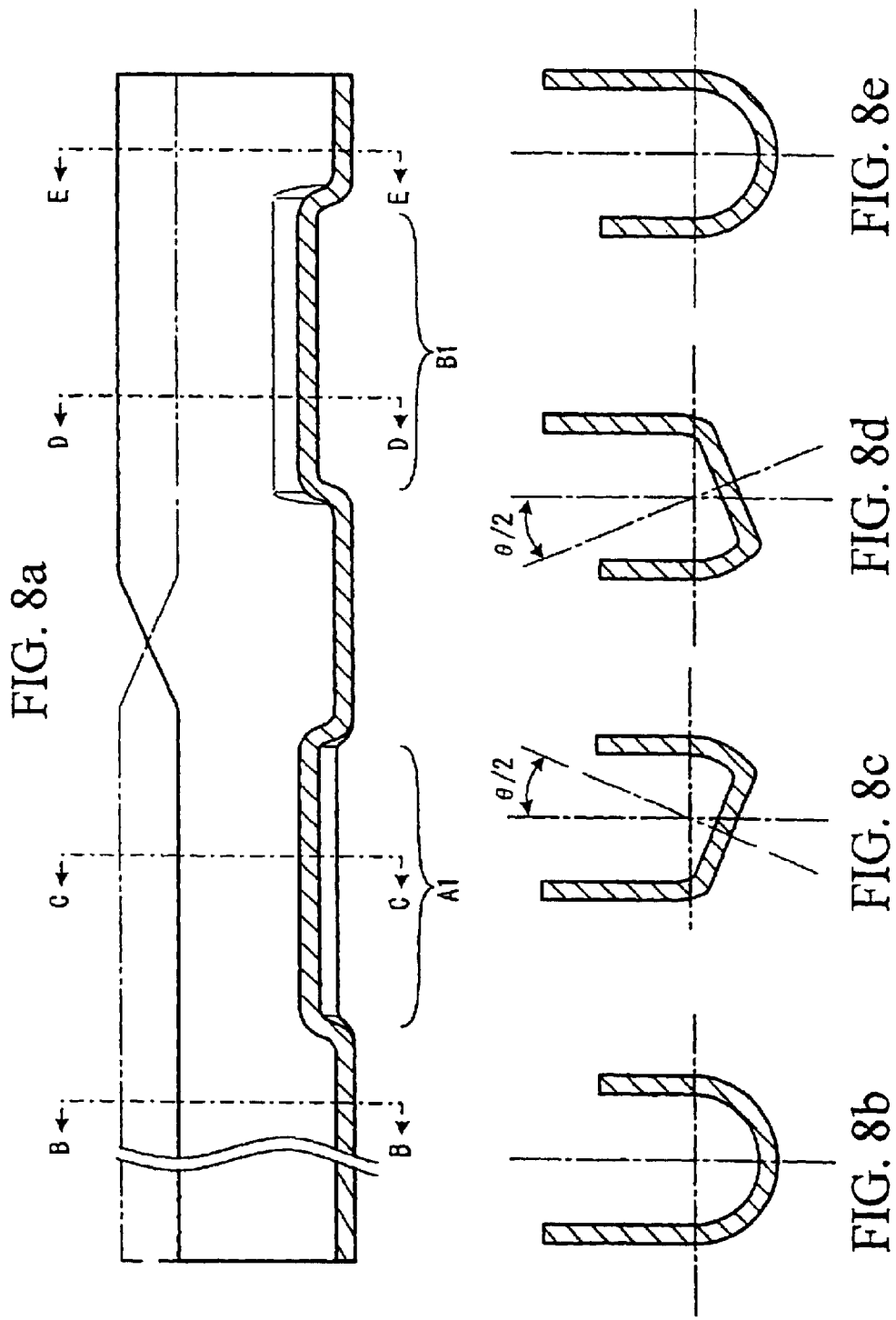

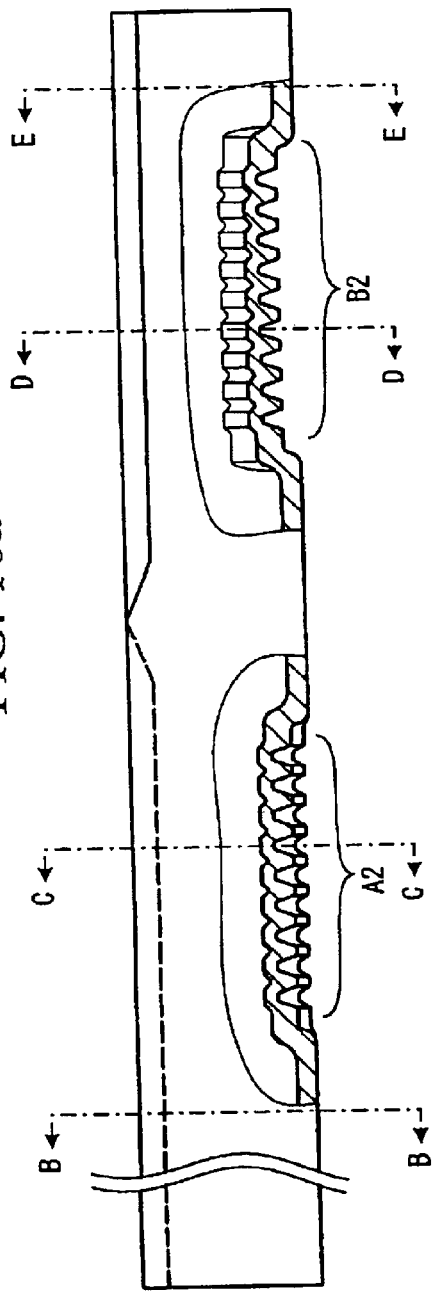
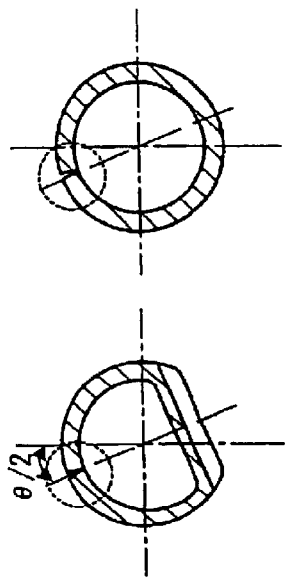
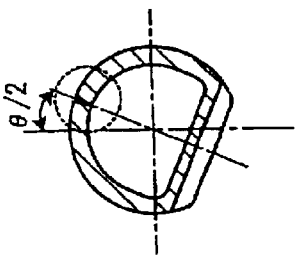
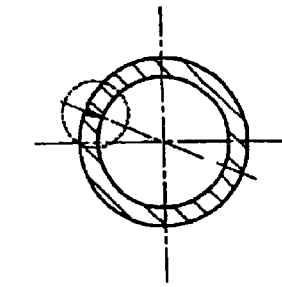
FIG. 10a
FIG. 10b
FIG. 10c
FIG. 10d
FIG. 10e

HOLLOW RACK SHAFT AND MANUFACTURING METHOD THEREOF

CROSS-REFERENCE TO RELATED APPLICATIONS

This application is a divisional of co-pending U.S. patent application Ser. No. 09/994,526, filed Nov. 27, 2001, hereby incorporated by reference, which is based Japanese Patent Application No. 2000-383268, filed in Japan on Dec. 18, 2000, the contents of which are hereby incorporated by reference.

BACKGROUND OF THE INVENTION

1. Field of the Invention

The present invention relates to a hollow rack shaft for an automobile steering system, particularly relates to a rack shaft commonly known as dual pinion-type steering system, which is provided with two rack teeth groups on one rack shaft and its manufacturing method.

2. Description of the Related Arts

For an automobile steering system, a type of a rack shaft provided with two rack teeth groups on one rack shaft is known. Conventionally, this type of rack shaft is produced by the method as using a solid bar and forming rack teeth groups in two places of this bar.

Currently, to reduce the consumption of automobile fuel in consideration of an environmental problem and others, lightweightizing automobile parts is promoted. In such a situation, a dual pinion-type rack shaft is lightweightized by the method that deep holes are drilled to the solid body to the axial direction from the both ends of the shaft. However, the areas that can be machined by the above method are only the shaft areas from both ends to rack areas, which aren't provided with rack teeth. Hence, the rack areas, and the shaft area between one rack area and the other rack area still remain solid, therefore lightweightizing is insufficient.

As disclosed in Japanese Patent Application Laid-Open No. Hei 11-180318 or No. Hei 11-278287, it is also proposed that a hollow rack shaft provided with a single rack teeth group is formed with one plate workpiece. However, such a manufacturing method is not developed for the dual pinion-type rack shaft and the fact is that the dual pinion-type rack shaft is still made of solid workpiece.

As described above, as the dual pinion-type rack shaft is made of a solid bar, it has the following problems.

1. Working time in a deep hole working process for lightweightizing is long.
2. Much material is wasted and a yield is lowered. Therefore, the manufacturing cost is increased.
3. Depth of each hole for lightweightizing the shaft is limited within a range of drilling from each end of the shaft.
4. As the rack areas and the area between them are solid, the rack shaft is not completely hollowed.
5. Therefore, lightweightizing of the rack shaft is insufficient.

SUMMARY OF THE INVENTION

The present invention has an object of solving the above-mentioned problems.

An object of the invention is to provide a hollow rack shaft for a steering system, having two rack teeth groups located longitudinally apart from each other, these rack groups are formed by plastic working.

The hollow rack shaft provided by the present invention is acquired by plastically deforming one plate workpiece.

Further, the respective rack teeth groups have phase difference as to an angle around the axis of the hollow rack shaft.

Further, in one embodiment, the rack teeth groups of the shaft are sequentially formed by die forming.

Further, in another embodiment, the rack teeth groups of the shaft are simultaneously formed by die forming.

Another object of the invention is to provide a method of manufacturing a hollow rack shaft for a steering system having two rack teeth groups, as located longitudinally apart from each other and as have phase difference as to an angle around axis of the shaft, wherein the shaft is formed of one plate workpiece which has two areas as the center lines of longitudinal direction at the areas are offset corresponding to the phases of the rack teeth groups.

Hereby, the following effects are expected by the hollow rack shaft according to the invention or its manufacturing method according to the invention.

1. Deep hole working process for lightweightizing is not required and working time is shortened.
2. As cutting process is not required, the material is hardly wasted and a yield rate is satisfactory.
3. The rack shaft is hollowed throughout the whole body.
4. Therefore, the rack shaft is lightweightized.
5. As the rack teeth groups are formed in different phase, a steering system ray-out can be designed flexibly. As each rack teeth group is formed with dies, the tooth profile can be designed hardly with restraint in consideration of working and the hollow rack shaft according to the invention can be coped with both constant gear ratio (CGR) and variable gear ratio (VGR).
6. The manufacturing process can be reduced by integrally forming a plate workpiece.
7. According to the invention, the manufacturing cost for the rack shaft can be reduced.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and together with the description, serve to explain the principles of the invention.

FIGS. 1a and 1b show a plate workpiece 1 used in the invention and embodiments. The former is a front view of the workpiece and the latter is a sectional view on line B—B in FIG. 1a;

FIGS. 2a to 2e are sectional views of the form of the workpiece 1 after the first process in the first embodiment is finished. FIG. 2a is a front sectional view, FIG. 2b is a sectional view on line B-B in FIG. 2a, FIG. 2c is a sectional view on line C—C in FIG. 2a, FIG. 2d is a sectional view on line D—D in FIG. 2a and FIG. 2e is a sectional view on line E—E in FIG. 2a;

FIG. 3a is a front sectional view, FIG. 3b is a sectional view on line C—C in FIG. 3a and shows a rack teeth group A2. FIG. 3c is a sectional view on line D—D in FIG. 3a and shows a rack teeth group B2;

FIGS. 4a to 4e show the form of the workpiece after the third (and the fourth) processes in the first embodiment (and the second embodiment) are finished. FIG. 4a is a front sectional view, FIG. 4b is a sectional view on line B—B in FIG. 4a, FIG. 4c is a sectional view on line C—C in FIG. 4a, FIG. 4d is a sectional view on line D—D in FIG. 4a and FIG. 4e is a sectional view on line E—E in FIG. 4a;

FIGS. 5a to 5e are sectional views of the form after the first process in the second embodiment is finished. FIG. 5a is a front sectional view, FIG. 5b is a sectional view on line B—B in FIG. 5a, FIG. 5c is a sectional view on line C—C in FIG. 5a, FIG. 5d is a sectional view on line D—D in FIG. 5a and FIG. 5e is a sectional view on line E—E in FIG. 5a;

FIG. 6a is a front sectional view and FIG. 6b is a sectional view on line C—C in FIG. 6a;

FIG. 7a is a front sectional view and FIG. 7b shows a sectional view on line D—D in FIG. 7a overlapped on a sectional view on line C—C and shown by a dotted line;

FIGS. 8a to 8e show the form after the first process in the third embodiment is finished. FIG. 8a is a front sectional view, FIG. 8b is a sectional view on line B—B in FIG. 8a, FIG. 8c is a sectional view on line C—C in FIG. 8a, FIG. 8d is a sectional view on line D—D in FIG. 8a and FIG. 8e is a sectional view on line E—E in FIG. 8a;

FIG. 9a is a front sectional view, FIG. 9b is a sectional view on line C—C in FIG. 9a and shows the rack teeth group A2. FIG. 9c is a sectional view on line D—D in FIG. 9a and shows the rack teeth group B2; and FIGS. 10a to 10e show the form after the third process is finished. FIG. 10a is a front sectional view, FIG. 10b is a sectional view on line B—B in FIG. 10a, FIG. 10c is a sectional view on line C—C in FIG. 10a, FIG. 10d is a sectional view on line D—D in FIG. 10a and FIG. 10e is a sectional view on line E—E in FIG. 10a.

DESCRIPTION OF THE PREFERRED EMBODIMENTS

Three favorable embodiments of the invention related to a hollow rack shaft provided with two rack teeth groups and its manufacturing method will be described below:

(a) the first embodiment: a case that phase difference θ is small;

(b) the second embodiment: a case that phase difference θ is large; and (c) the third embodiment: a case that phase difference θ is shared between right side and left side whether it is large or not.

Relation in dimension and angle in the following drawings include exaggeration to some extent to simplify the description.

First Embodiment (The Case that Phase Difference θ is Small)

FIGS. 1a and 1b show a plate workpiece 1 used in the invention and the embodiments. This workpiece 1 is a substantially rectangular plate and is provided with areas A1 and B1 in which two rack teeth groups are respectively formed in the longitudinal direction. Difference y (offset y) is provided between center lines in the direction of the width in these areas A1 and B1 as shown in FIG. 1a. Each width of the plate in the areas is adjusted beforehand in consideration of difference of the volume from the area that the rack teeth group would be formed.

The above-mentioned workpiece 1 is bent into a gutter-like shape in the first process as shown in FIGS. 2a to 2e.

Forming in the first process is executed by bending the workpiece 1 shown in FIGS. 1a to 1e by a press machine and others. The areas A1 and B1 are respectively formed in a gutter-like shape or a U-shape having a flat part at the bottom as shown in FIGS. 2c and 2d. In the area B1 as shown in FIG. 2d, the bottom tilted by a phase angle θ to the bottom in the area A1 shown in FIG. 2c. The other areas are respectively formed in a U-shape having a semi-circular bottom as shown in FIGS. 2b and 2e.

Figure 3A:
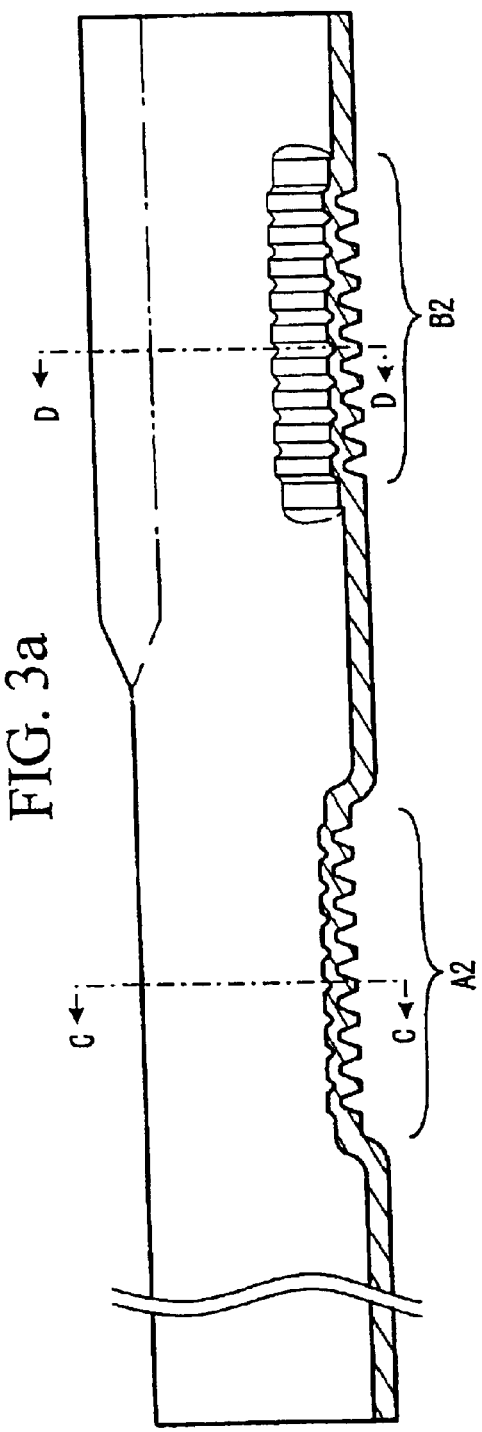
FIGS. 3a to 3c show the form of the workpiece 1 after the second process in the first embodiment is finished.
Figure 3C:
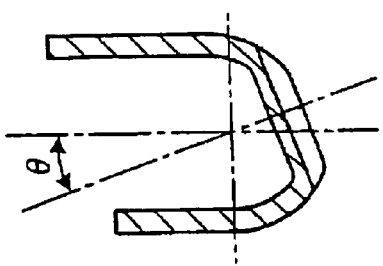
Figure 3B:
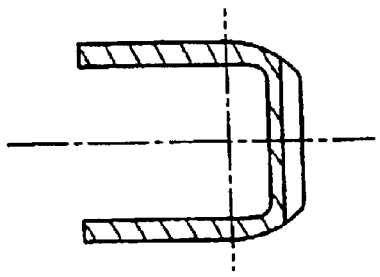

The second process is applied to the flat bottom of the workpiece 1. In this process, a rack teeth group A2 and a rack teeth group B2 are respectively formed in the areas A1 and B1 as shown in FIGS. 3a to 3c.

Dimensions of the two rack teeth groups A2 and B2 can be designed arbitrarily values, and hence, even if the one rack teeth group was formed as CGR and other as VGR, the rack shaft and the rack teeth according to the invention don't have any problems. Naturally it is possible that two rack teeth groups are formed as equal dimensions for example, both CGR or VGR.

The rack teeth are formed by putting the workpiece between the lower die that has the shape corresponding with rack teeth shape and upper die that has concave-convex shape corresponding to lower die shape. The concave-convex shape of each die is transferred to the workpiece. Therefore, the back surface of the rack teeth, namely the inner surface of the tubed shaft, is formed into concave-convex profile corresponding to the outer surface of rack teeth as shown in FIGS. 3a to 3c.

At this time, it is the most desirable in the view of working time that at this time, the two rack teeth groups A2 and B2 are simultaneously formed by one pair of upper and lower dies having each corresponding tooth profile. However, in the case that a load capacity of a press machine is constrained, or in case that the shape shown in FIGS. 3a to 3c is not acquired in one process from the restraint of the shape, the two rack teeth groups may be sequentially formed one by one.

In the third process, the two open legs are bent to butt each other by the side and the workpiece is formed into a hollow tube.

FIGS. 4a to 4e show the form after the third process is finished at this time. It is desirable that the butted portions are adjusted as they are located just on the opposite side of each rack teeth group A2, B2 as shown by a dotted encirclement line in FIGS. 4b, 4c, 4d and 4e. The offset y or difference y in level of the center line in FIG. 1a is provided to adjust this.

In the first embodiment, as phase difference θ between two rack teeth groups is small, bending force loaded to the dies is not strong and the dies can be made relatively thinner. Hence, desirably, the two rack teeth groups can be simultaneously formed with one stroke by one set of upper die and lower die.

Second Embodiment (The Case That Phase Difference θ is Large)

In the case that phase difference θ between rack teeth groups is large, extremely large bending force is loaded to the dies when the forming method of the first embodiment is applied. Therefore, from a viewpoint of die strength, it becomes difficult to form two rack teeth groups simultaneously with one stroke. Desirable process in the is shown as follows.

A plate workpiece 1 is similar to that in the first embodiment shown in FIGS. 1a and 1b. However, the difference y (offset y) is larger corresponding phase difference θ of the rack shaft to be manufactured. The plate workpiece 1 is also bent in the first process, however, the degree of the bending is different from the first embodiment.

Figure 6A:
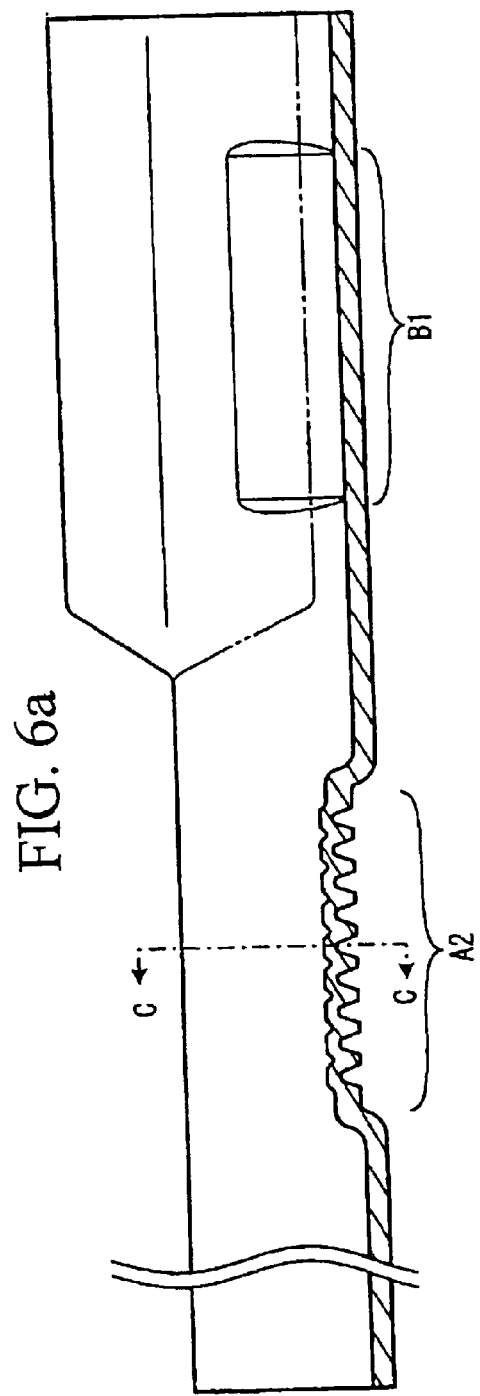
FIGS. 6a and 6b show the sectional form of the workpiece 1 after the second process in the second embodiment is finished.
Figure 6B:
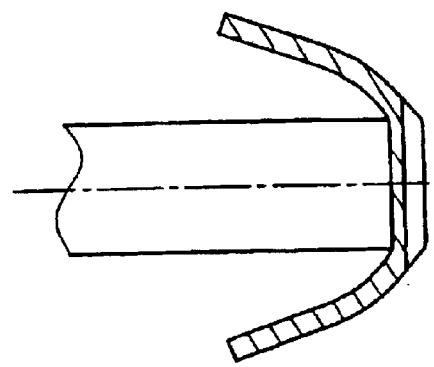

As shown in FIGS. 5a to 5e, an opening angle of the two legs is wider than that of the first embodiment (in the first embodiment the legs are formed substantially in parallel) and the flat bottom in area B1 is tilted by a phase angle θ to the flat bottom in area A1. In the second process, one rack teeth group A2 is formed by dies as shown in FIGS. 6a and 6b. The rack teeth group A2 is formed first by deforming the flat bottom in area A1.

Figure 7A:
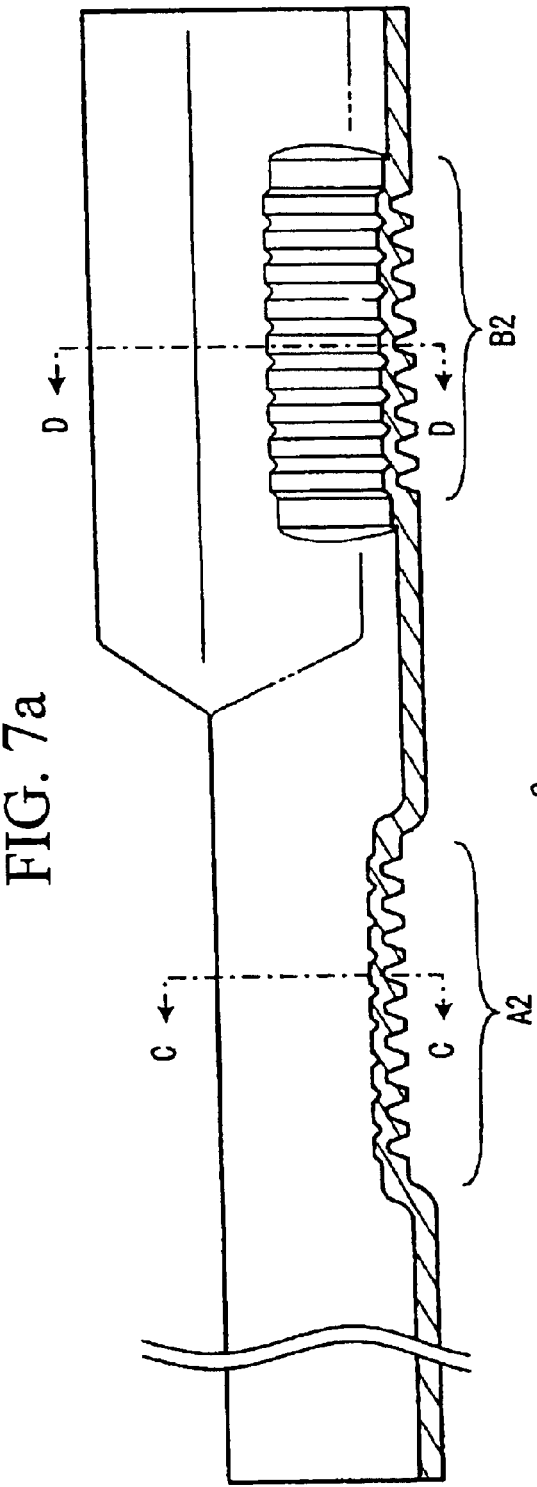
FIGS. 7a and 7b show the sectional form after the third process in the second embodiment is finished.
Figure 7B:
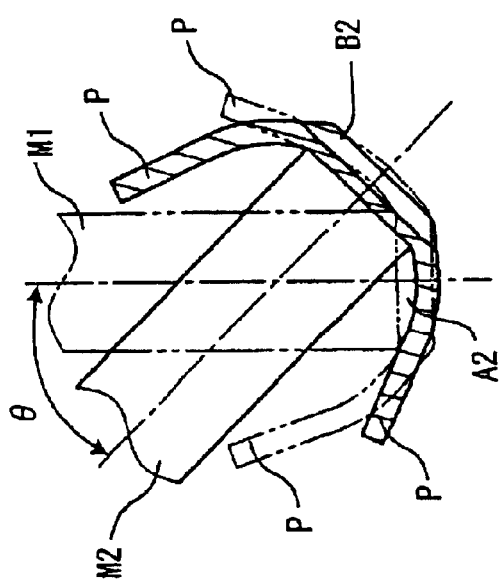

In the third process, the other rack teeth group B2 is formed on the bottom in area B1 as shown in FIGS. 7a and 7b. In FIG. 7b, the sectional view on line C—C (shown by dotted line) is overlapped on the sectional view on line D—D.

As the two legs (side walls) p are opened widely, the dies M1 and M2 for forming the two rack teeth groups A2 and B2 respectively can be inserted without interference with the legs p through the space between them. According to above method, as dies M1 and M2 can receive the forging load perpendicularly for both A2 and B2, this method also has more advantage about the die strength.

As the workpiece 1 is rotated by angleθ after the second process completed (the rack teeth group A2 has been formed), the dies for forming the rack teeth group B2 can face properly to the flat bottom. Hence, the dies can be designed more easily. After the two rack teeth groups A2 and B2 have been formed as described above, in the fourth process, the legs (walls) are bent to butt each other by the side and the workpiece is formed into a tube as the first embodiment.

A merit of the second embodiment is that the method is applicable to the rack shaft with phase difference θ of a wide range from small to large.

Third Embodiment (The Case That Phase Difference θ is Shared Between Right Side and Left Side)

As described above, in proportion to increase of phase difference θ between the rack teeth groups, it becomes harder to form the groups simultaneously with one stroke of dies. According to the third embodiment, the two rack teeth groups can be simultaneously formed with one stroke of dies, even though their phase difference θ is relatively large.

A workpiece 1 is substantially similar to that in the first embodiment shown in FIGS. 1a and 1b, however, difference y in level (offset y) between center lines is shared between right side and left side and the two rack teeth groups are formed on the respective flat bottoms of areas A1 and B1. The bottoms are tilted in opposite direction by a half of difference θ respectively, as shown in FIGS. 8a to 8e, FIGS. 9a to 9c and FIGS. 10a to 10e.

In the first process, the plate workpiece 1 is bent into a gutter-like shape having substantially parallel side walls (legs), flat bottoms in areas A1 and B1 as shown in FIGS. 8c and 8d, and semi-circular bottoms in the areas as shown in FIGS. 8a and 8e. The bottoms in the area A1 and the area B1 are tilted mutually in a reverse direction by a phase angle θ/2.

Figure 9A:
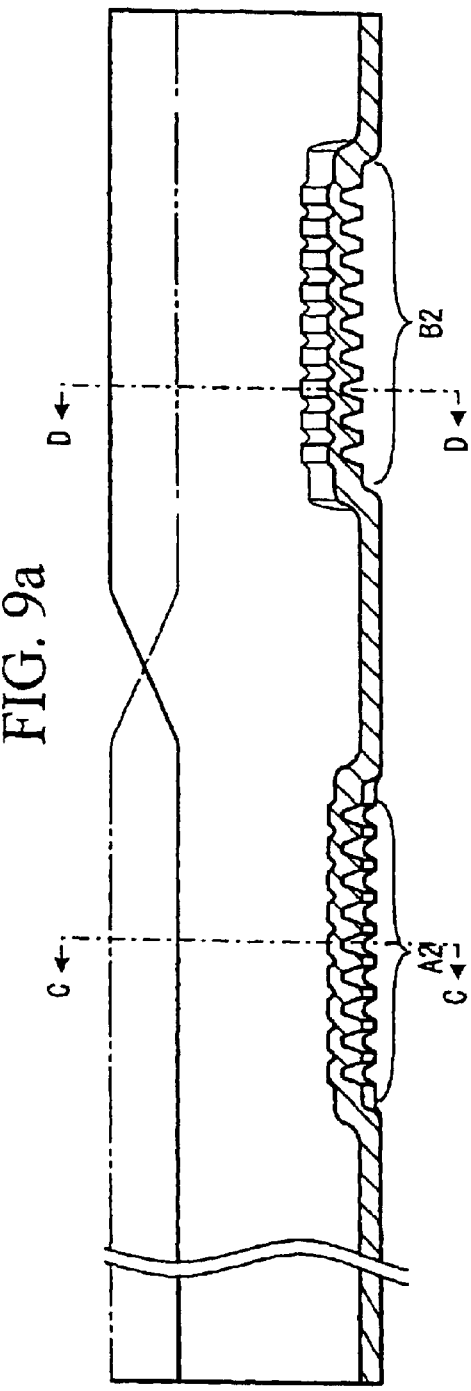
FIGS. 9a to 9c show the form of the workpiece 1 after the second process is finished.
Figure 9C:
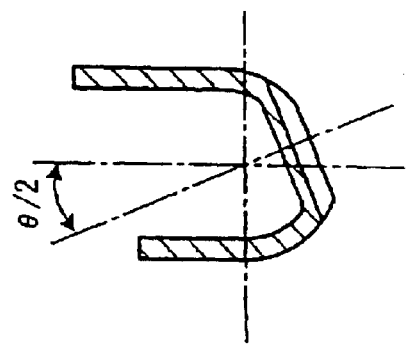
Figure 9B:
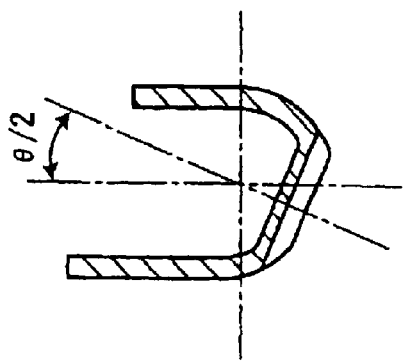

FIGS. 9a to 9c show the shape of workpiece after the second process is finished. In the second process, two rack teeth groups A2 and B2 are formed on the bottoms in the areas A1 and B1 respectively.

The rack teeth groups are formed simultaneously by putting the workpiece between one pair of upper and lower dies. In more detail, the upper die has two groups of concave-convex die surfaces corresponding to the concave-convex shape of the inner surfaces (back-surfaces) of the two rack teeth groups which are to be formed. The shapes of the die surfaces of the upper die are transferred onto the inner surface of the workpiece. The lower die has also two groups of concave-convex die surfaces corresponding with the rack teeth shape which are to be formed. The shapes of the die surfaces are transferred onto the outer surfaces of the workpiece.

At this time, it is the most desirable in view of working time that the two rack teeth groups A2 and B2 are simultaneously formed by one pair of upper and lower dies having each corresponding tooth profile. It is also possible to form the two rack teeth groups A2 and B2 sequentially one by one by using a two pairs of dies, as described in the first embodiment.

In the third process after the rack teeth have been formed, the legs (walls) are bent to butt each other by the side and the workpiece is formed into a tube as shown in FIGS. 10a to 10e.

It is desirable that offset y (difference y in level) is adjusted according to an angle θ (θ/2) as the butted parts are located just on the reverse side of the rack teeth group A2 or B2 as shown by the encirclement of a dotted line in FIGS. 10b, 10c, 10d and 10e.

In the third embodiment, as each angle θ/2 can be smaller than the θ which is tilted one way in the first and second embodiment and as transverse bending force loaded to each dies is counterbalanced and reduced to a relatively small value, it is preferable to form simultaneously the two rack teeth groups in one stroke of the dies.

If necessary, the workpiece as described in the first, second and third embodiments, is performed post-process as welding butted portion, correcting curvature of the tube, cutting the ends of the tube and heat treatment. Thereby, a hollow rack shaft lightweightized as a product is obtained.

When the phase difference θ between the two rack teeth groups is not required to the hollow rack shaft, the difference y shown in FIG. 1a is, needles to say, made to zero, it is possible to form as same as these embodiments.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A method of manufacturing a hollow rack shaft for a steering system having two rack teeth groups, being located longitudinally apart from each other and out of phase by an angle around the axis of said shaft, wherin:

said shaft is formed of one plate workpiece having two areas; and the center lines in the longitudinal directon at said areas are offset corresponding to phase difference between said rack teeth groups.

* * * * *

UNITED STATES PATENT AND TRADEMARK OFFICE
CERTIFICATE OF CORRECTION

PATENT NO. : 6,782,772 B2
DATED : August 31, 2004
INVENTOR(S) : Akira Tsubouchi et al.

It is certified that error appears in the above-identified patent and that said Letters Patent is hereby corrected as shown below:

Column 5,
Line 32, delete "angleΘ" and insert -- angle Θ --.

Column 6,
Line 56, after "groups,", insert -- said groups --.
Line 58, delete "wherin", and insert -- wherein --.

Signed and Sealed this

First Day of February, 2005

JON W. DUDAS
*Director of the United States Patent and Trademark Office*